(12) United States Patent
Lauermann et al.

(10) Patent No.: US 7,914,298 B2
(45) Date of Patent: Mar. 29, 2011

(54) SOLAR BOX AND TWO POSITION SOLAR CONNECTORS

(75) Inventors: Mark Edwin Lauermann, Harrisburg, PA (US); Thomas A. Brungard, York, PA (US); David Cours, Harrisburg, PA (US); Christopher George Daily, Harrisburg, PA (US); Scott S. Duesterhoeft, Etters, PA (US); Stephen Daniel Gherardini, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 85 days.

(21) Appl. No.: 12/249,425

(22) Filed: Oct. 10, 2008

(65) Prior Publication Data

US 2010/0093231 A1    Apr. 15, 2010

(51) Int. Cl.
*H01R 12/00*    (2006.01)
(52) U.S. Cl. ..................................... 439/76.1
(58) Field of Classification Search ................. 439/709, 439/76.1, 404, 487, 485
See application file for complete search history.

(56) References Cited

U.S. PATENT DOCUMENTS

| | | | |
|---|---|---|---|
| 5,382,177 A | 1/1995 | Hutchinson, Jr. et al. | |
| 6,582,249 B1 | 6/2003 | Boeck et al. | |
| 6,655,987 B2 | 12/2003 | Higashikozono et al. | |
| 6,822,503 B2 | 11/2004 | Jang et al. | |
| 7,097,516 B2 | 8/2006 | Werner et al. | |
| 7,134,883 B2 | 11/2006 | Werner et al. | |
| 7,234,856 B2 | 6/2007 | Bahramian | |
| 7,282,635 B2 | 10/2007 | Utsunomiya et al. | |
| 7,291,036 B1 * | 11/2007 | Daily et al. | 439/487 |
| 7,648,371 B2 * | 1/2010 | Boensch et al. | 439/76.1 |
| 2007/0137689 A1 | 6/2007 | Feldmeier et al. | |

FOREIGN PATENT DOCUMENTS

| | | |
|---|---|---|
| CN | 2 909 650 | 6/2007 |
| EP | 1 501 157 | 1/2005 |
| EP | 1 729 369 | 12/2006 |
| EP | 1777754 A1 | 4/2007 |
| WO | WO 2008/057493 | 5/2008 |

OTHER PUBLICATIONS

International Search Report, International Application No. PCT/US2009/005478, International Filing Date Jun. 10, 2009.

* cited by examiner

*Primary Examiner* — Jean F Duverne

(57) ABSTRACT

A connecting box, gland nut, and electrical connector for the solar connector industry is disclosed. The connecting box, the gland nut, and the electrical connector require a tool to disengage, are being resistant to external environmental stressors, and/or provide the ability to monitor information regarding the connecting box, the gland nut, and/or the electrical connector.

19 Claims, 5 Drawing Sheets

SOLAR BOX AND TWO POSITION SOLAR CONNECTORS

FIELD OF THE INVENTION

The present invention is directed to an electrical connector assembly. In particular, the present invention is directed to a connecting box, a gland nut, and a connector for a solar panel.

BACKGROUND OF THE INVENTION

Solar panels have a large number of solar cells which are used to convert power from sunlight. Power generated by the solar cells is coupled via electric lines to a rectifier for example, for feeding into the alternating current (AC) network or to a battery. A connecting box with one or more connectors is generally provided for coupling to the solar panel.

Connectors typically include a pin housing containing pin contacts mated to a socket housing containing socket contacts. The pin housing and the socket housing are physically mated, which physically and electrically connect the pin and socket contacts to form an electrical connection.

Connecting boxes and connectors may be subject to tampering or access by individuals without an adequate understanding of electrical connectors. Most connector assemblies can be unmated without the use of any special skill or tool. To address this, certain industries have promulgated specific requirements for electrical connectors. For instance, under some industry and government standards and regulations, certain electrical connections require a tool in order to unmate any connector assembly carrying an electrical current.

Connecting boxes and connectors may be subject to external environmental stressors including rain, snow, floods, and other moisture producing events and temperature extremes. These environmental stressors may decrease the performance of the electrical connection, may damage connecting boxes and/or connectors, and may require increased maintenance. Covering connecting boxes and connectors can prevent some effect of these environmental stressors but covering can be expensive and bulky. As such, under some industry and government standards and regulations, cold impact resistance, flammability resistance, and ultraviolet light resistance requirements have limited the availability of certain modifications for the purpose of providing connecting boxes and connectors for the solar panel industry.

Therefore, there is an unmet need to provide a connecting box, connector, and connecting method that requires a tool for access, is resistant to external environmental stressors, is not expensive or bulky, and/or does not cause additional interference.

SUMMARY OF THE INVENTION

This invention provides a connecting box, a gland nut, and a connector requiring a tool for access, resistant to external environmental stressors without being expensive, bulky, or causing additional interference.

According to an embodiment, a connecting box for use with solar panels includes a base housing, a lid, and at least one latch. In the embodiment, the base housing is arranged and disposed to retain a substrate, the base housing being configured to releasably attached to the lid. The latch is arranged and disposed for a tool to be inserted into a latch release thereby disengaging a latch catch permitting the base housing to be released from the lid and the connecting box is arranged and disposed for attaching it to a solar panel.

According to another embodiment, a gland nut includes a nut-shaped portion configured to be rotated by a tool, a tapered portion, a generally cylindrical portion including an inner thread, and a cable seal configured to be inserted into a pinch ring. In the embodiment, the pinch ring has a plurality of arms extending from a ring base. The inner thread configured to threadedly engage a connecting box or a connector. The nut-shaped portion, the tapered portion, the generally cylindrical portion, the cable seal, and the pinch ring are configured to circumferentially bound a cable. The plurality of arms of the pinch ring are configured to be forced inward by the tapered portion toward the cable upon the inner thread engaging the connecting box or the connector and forced in the direction of the connecting box or the connector.

According to another embodiment, an electrical connector includes a first gland nut and a second gland nut, a pin housing arranged and disposed to threadedly engage the first gland nut, and the socket housing arranged and disposed to threadedly engage the second gland nut. In the embodiment, each gland nut includes a nut-shaped portion configured to be rotated by a tool, a generally cylindrical portion including an inner thread, a tapered portion, a cable seal arranged and disposed to be inserted into a pinch ring, the pinch ring arranged and disposed with a plurality of arms extending from a ring base. In the embodiment, the plurality of arms of the pinch ring are configured to be forced inward by the tapered portion toward a cable upon the inner thread engaging the connecting box or the connector and forced in the direction of the connecting box or the connector. The nut-shaped portion, the generally cylindrical portion, the cable seal, and the pinch ring are configured to circumferentially bound the cable. The pin housing is arranged and disposed to mate with a socket housing and the socket housing is arranged and disposed to mate with the pin housing. The pin housing or the socket housing includes a releasing slot arranged and disposed to require a tool to unmate the pin housing from the socket housing. The electrical connector is arranged and disposed for preventing moisture from entering the electrical connector.

An advantage of the present invention is requiring a tool to disengage.

Another advantage of the present invention is resistance to external environmental stressors.

Yet another advantage of the present invention is the ability to mate two electrical connectors at once.

Still yet another advantage of the present invention is the keying of the connectors thereby preventing miswiring.

Further aspects of the system and apparatus are disclosed herein. The features as discussed above, as well as other features and advantages of the present invention will be appreciated and understood by those skilled in the art from the following detailed description and drawings.

BRIEF DESCRIPTION OF THE DRAWINGS

Wherever possible, the same reference numbers will be used throughout the drawings to represent the same parts.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
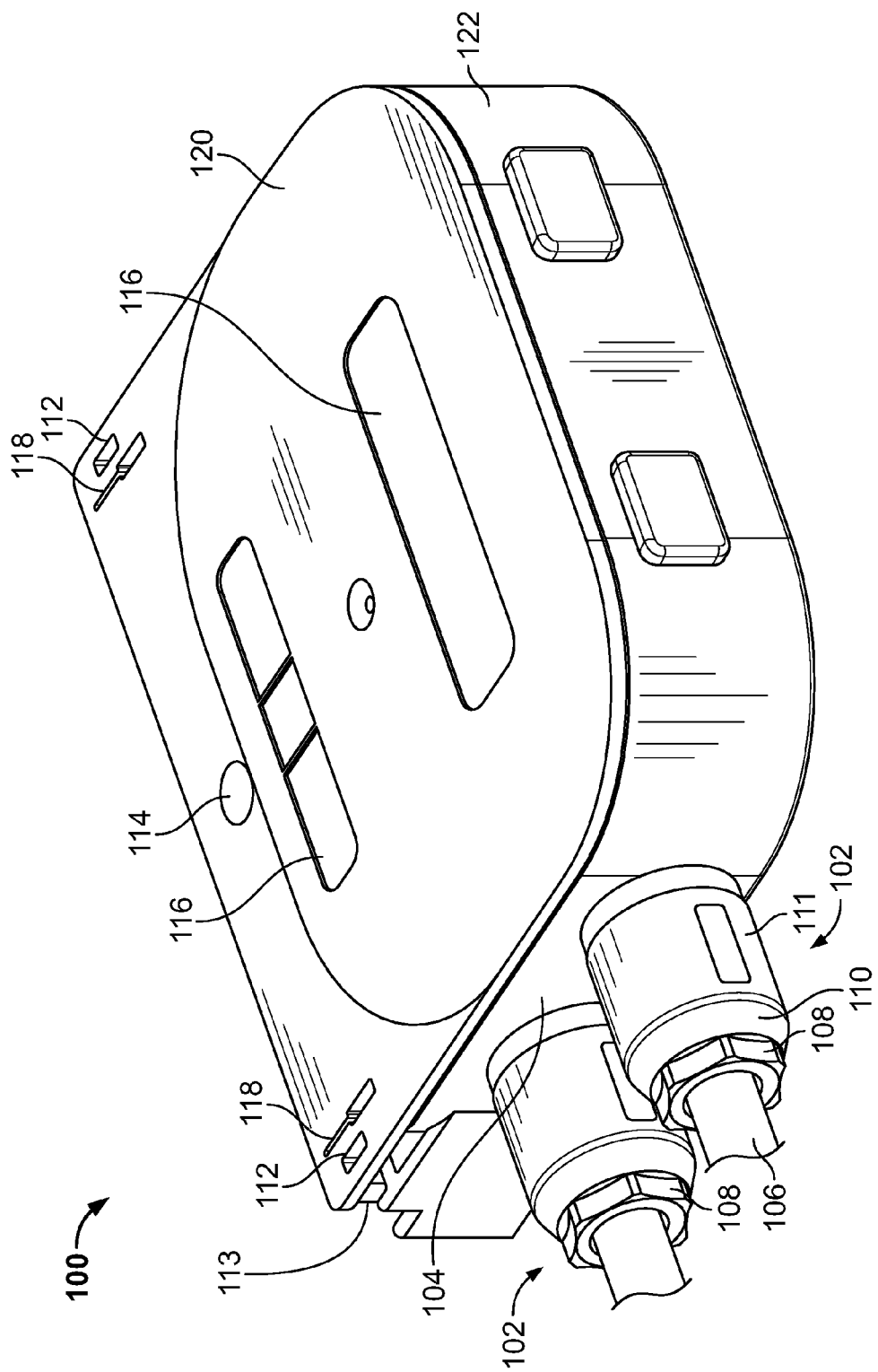
FIG. 1 illustrates a perspective view of an exemplary embodiment of a gland nut and connecting box according to the invention.

Referring to FIG. 1, an exemplary embodiment of a connecting box 100 and a plurality of gland nuts 102 is shown. Connecting box 100 includes a lid 120 and a base housing 122. Connecting box 100 is a plastic box with two substantially planar surfaces defining the top surface of connecting box 100 and the bottom surface of connecting box 100. Connecting box 100 further includes four side surfaces connected internally by curved portions generally defining a rectangle. Connecting box 100 is configured to be attached to a solar panel (not shown). In the illustrated embodiment, connecting box 100 is arranged and disposed to be attached to the solar panel on the top of connecting box 100 by lid 120 attached to the solar panel. In another embodiment, connecting box 100 is arranged and disposed to be attached to the solar panel by base housing 122 being attached to the solar panel. As will be appreciated, in other embodiments, connecting box 100 may be attached to other surfaces on either lid 120 or base housing 122.

Figure 2:
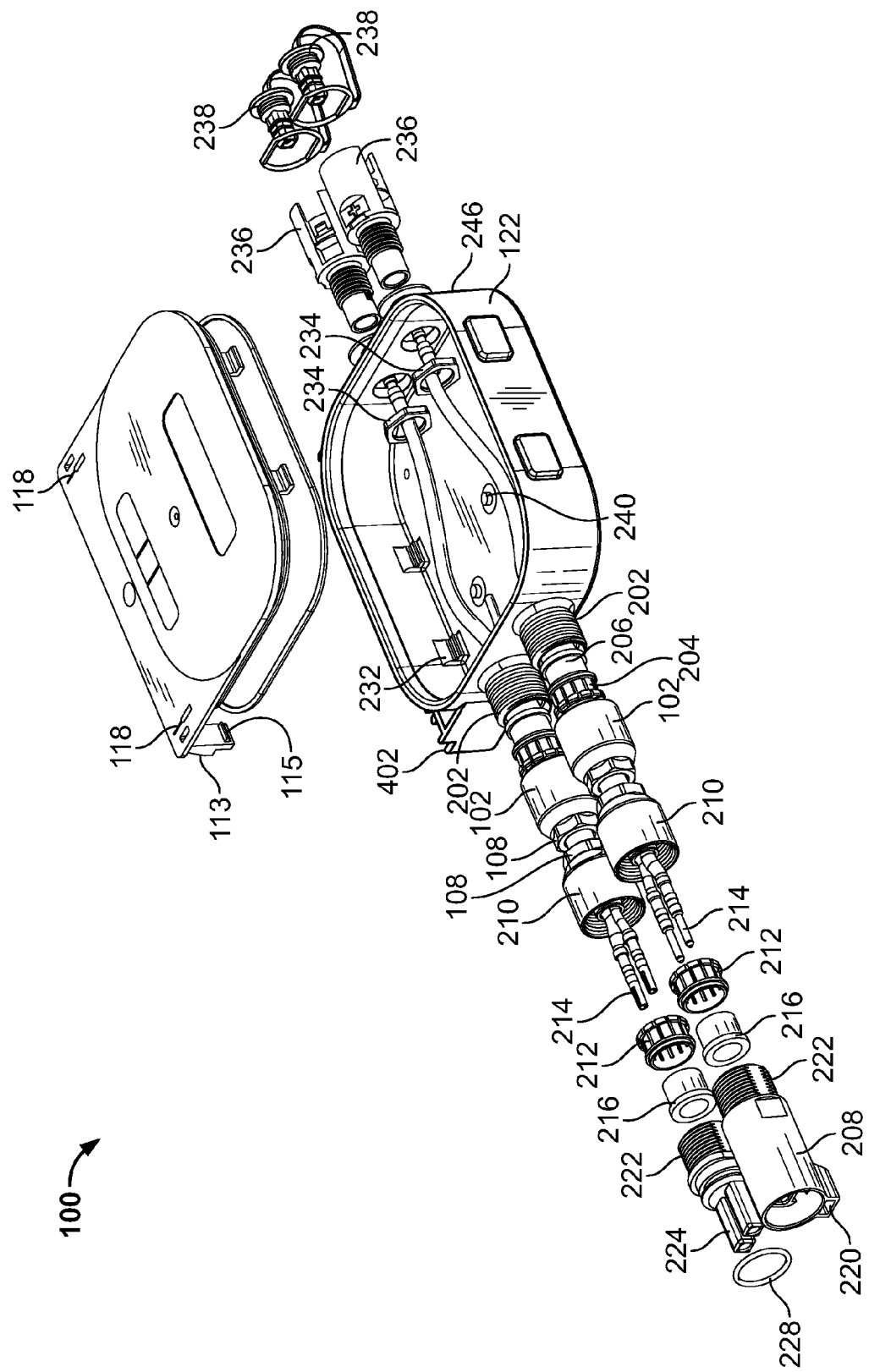
FIG. 2 illustrates an exploded perspective view of an exemplary embodiment of a connector, the gland nut, and the connecting box according to the invention showing the internal portions of the connecting box and the gland nut.

In the illustrated embodiment, lid 120 includes a plurality of lid tether slots 112, a lid breather 114, a plurality of lid text boxes 116, a plurality of lid tool pictures 118, and a latch release 113. In the embodiment, lid tool pictures 118 are positioned proximal to latch release 113 and signify that a screwdriver is required to release lid 120 from base housing 122 by depressing latch release 113 with the screwdriver. Lid tether slots 112 are configured to permit a band or wire or to be inserted into lid tether slots 112 together or independently and wrapped around a portion of base housing 122 or entire base housing 122. The band or wire in conjunction with lid tether slots 112 substantially prevents base housing 122 from falling upon being released from lid 120. Lid text boxes 116 permit information to be printed on lid 120. In the illustrated embodiment, lid 120 is configured to be attached to the side of the solar panel opposite the side of the solar panel configured to convert sunlight into energy. In other embodiments, lid 120 may be attached to other structures near the solar panel. In other embodiments, lid 120 may be attached in other orientations thereby positioning connecting box 100 in other directions. For instance, connecting box 100 may be positioned on side 104, opposing side 246, or the other sides of connecting box 100. Lid 120 may be attached to the solar panel by glue, fasteners, RTV adhesive sealant, or other adhesive. Upon lid 120 being attached to the solar panel, lid tether slots 112, lid breather 114, lid text boxes 116, and lid tool pictures 118 on lid 120 become inaccessible. Due to the inaccessibility of these features, when lid 120 is attached to the solar panel, features on lid 120 may be omitted. These omitted features include lid tether slots 112, lid breather 114, lid text boxes 116, and/or lid tool pictures 118. As illustrated in FIG. 2, lid 120 further includes a latch 115, which is a flexible piece of plastic integral with the lid 120 and able to be moved slightly as a result of a screwdriver or other tool depressing latch release 113, which is accessible from base housing 122 of connecting box 100. In other embodiments with lid 120 attached to the solar panel, breather 114, text boxes 116, and tool pictures 118 are included in base housing 122 (see FIG. 4).

Figure 3:
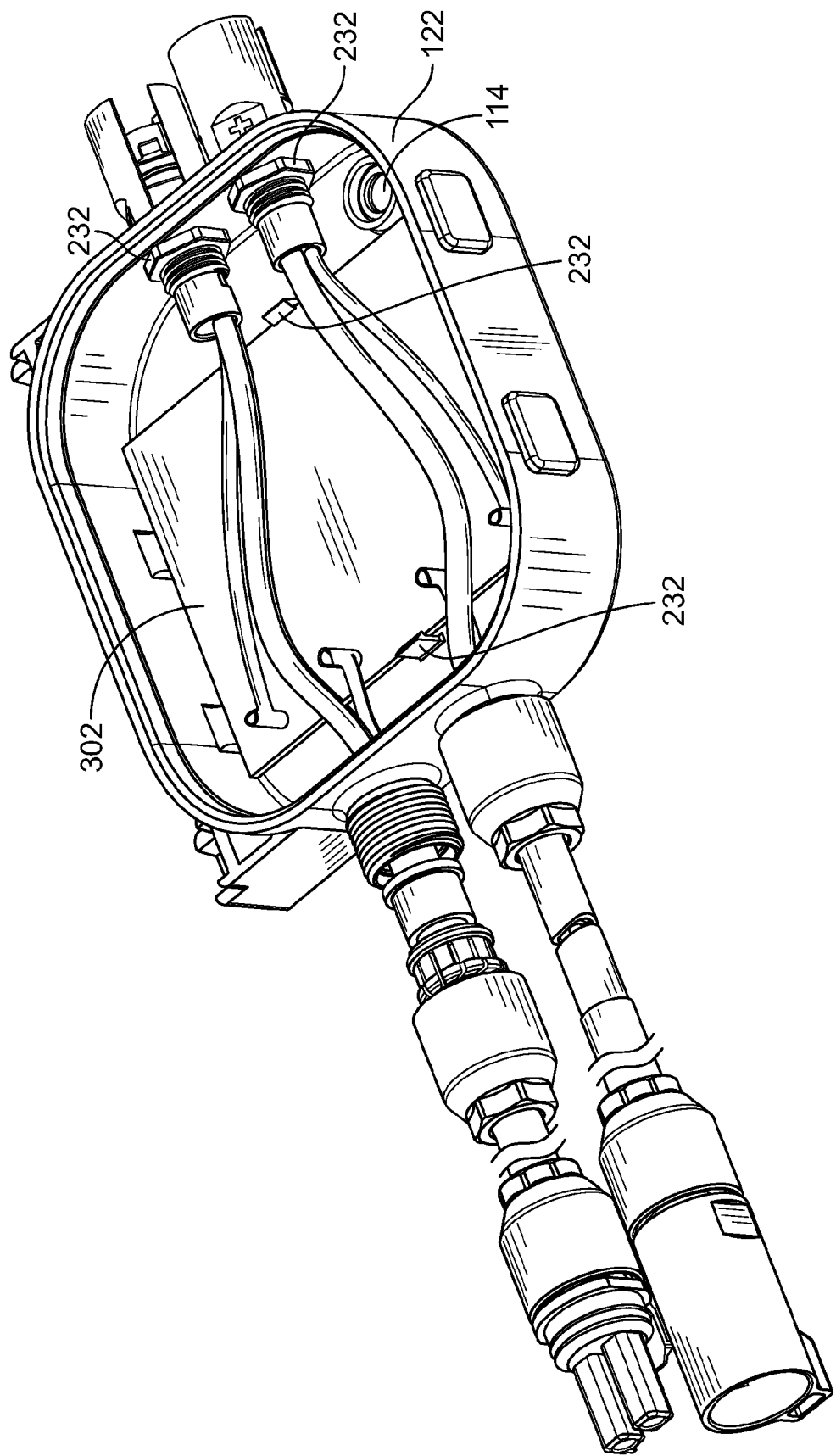
FIG. 3 illustrates a perspective view of an exemplary embodiment of a connector, the gland nut, and the connecting box according to the invention showing a substrate positioned inside the base housing of the connecting box.

Referring to FIGS. 2 and 3, base housing 122 of connecting box 100 includes a plurality of substrate snaps 232, a plurality of securing nuts 234, and breather 114. Substrate snap 232 is a polycarbonate tab configured to permit a substrate 302 to be properly positioned and releasably attached to base housing 122 (the term substrate includes printed circuit boards and other substrates). In another embodiment, substrate snap 232 may be made of other materials including, but not limited to, other plastics or metals. In other embodiments, substrate snap 232 may be molded into base housing 122. In yet other embodiments, other features for positioning the board are alternatively or additionally included. Substrate snap 232 permits positioning by allowing for substrate 302 to be aligned with substrate snap 232. Substrate snap 232 permits substrate 302 to be releasably attached to base housing 122 by extending over the top surface of substrate 302 when substrate 302 is pushed against substrate snap 232. In the illustrated embodiment, substrate snaps 232 are on opposing ends of base housing 122. In another embodiment, substrate snap 232 is positioned in conjunction with at least one other substrate snap 232 at various portions of the perimeter of a proper positioning for the substrate 302. In the illustrated embodiment, securing nuts 234 are configured to threadedly attach other connectors 236 (which may be any connector available) and breather 114 is a membrane configured to permit air to travel in or out of base housing 122 upon a change in temperature or pressure. By permitting air to exit base housing 122 upon a change in temperature or pressure, breather 114 substantially prevents the build up of condensation inside base housing 122. Breather 114 is comprised of a disc covering a series of concentric holes located on base housing 122. In the illustrated embodiment, the disc is comprised of porous polytetrafluoroethylene, but the disc could be comprised of any porous material that would substantially prevent moisture from coming into base housing 122. In another embodiment, a desiccant may be used for the purpose of preventing condensation build up.

Figure 4:
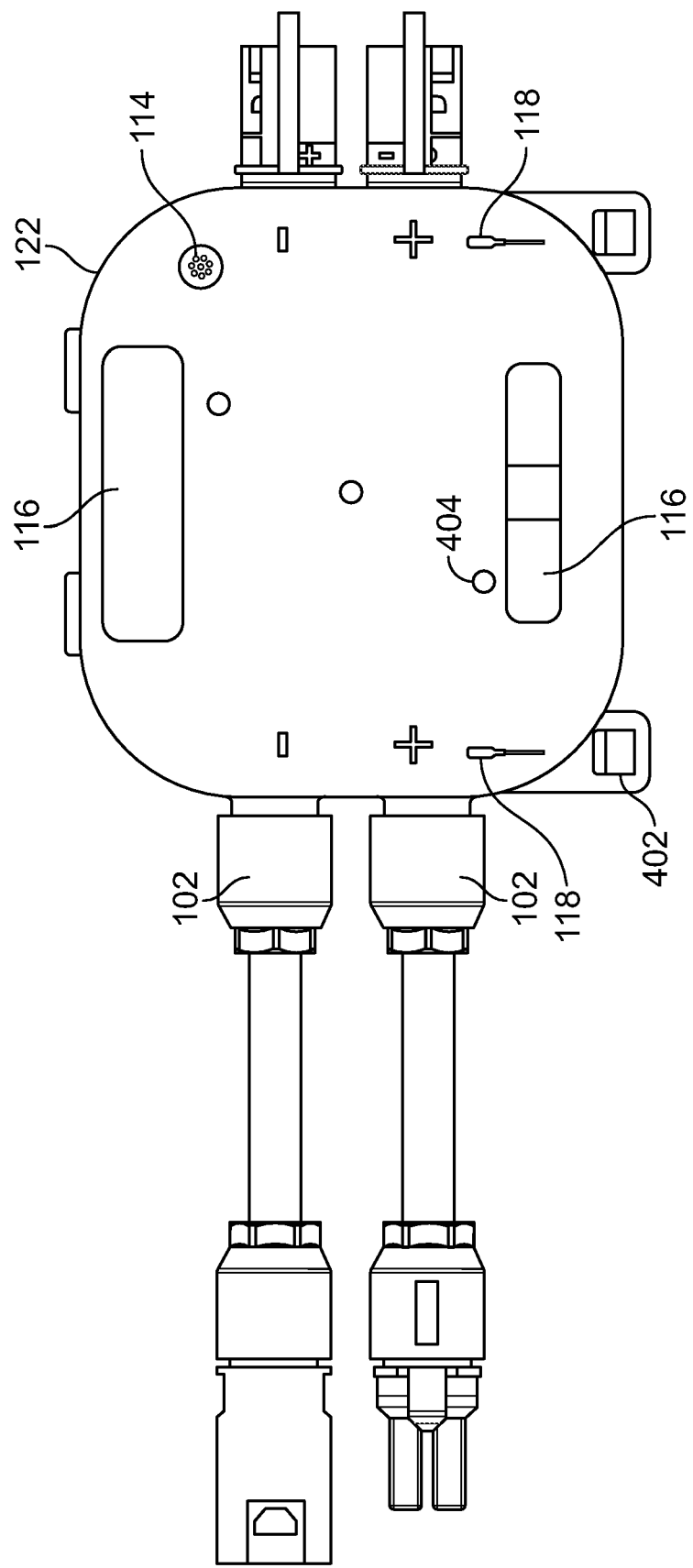
FIG. 4 illustrates a bottom view of an exemplary embodiment of the connector, the gland nut, and the connecting box according to the invention.

Referring to FIGS. 2 and 4, the base housing 122 includes a latch catch 402, breather 114, text boxes 116, tool pictures 118, and a plurality of threads 202. Latch catch 402 is a molded portion of base housing 122 configured to be engaged by latch 115 and disengaged by latch 115 upon a tool depressing latch release 113. In the embodiment illustrated in FIG. 2, latch release 113 is not easily accessible when lid 120 is attached to a surface such as a solar panel. To access latch release 113, when lid 120 is attached to a surface, connecting box 100 may be modified thereby allowing latch release 113 to be accessed by inserting a screwdriver into latch catch 402 from below. As will be appreciated, latch release 113 may be oriented in several other ways permitting access when lid 120 is attached to a surface. As shown in FIG. 2, thread 202 is integral to base housing 122 and protrudes from base housing 122 thereby permitting gland nut 102 to threadedly attach to thread 202. In the embodiment illustrated by FIG. 4, base housing 122 includes light pipe feature 404 comprised of a transparent, semitransparent, translucent, or semi-translucent material. In another embodiment, base housing 122 includes a hole (not shown) with a light pipe 240 (light transmission pipe) inserted into the hole. In yet another embodiment, the base housing includes light pipe feature 404 attached and protruding from base housing 122 and is generally tubular in geometry. In yet further another embodiment, light pipe feature 404 is integrated and protruding from base housing 122. In one embodiment, base housing 122 is comprised of a transparent, semitransparent, translucent, or semi-translucent material. In another embodiment, light pipe feature 404 is ultrasonically welded to base housing 122. In still yet another embodiment, light pipe feature 404 is a hole formed by machining, molding, casting, or other similar forming methods. In an additional embodiment, the portion of light pipe feature 404 inside connecting box 100 is configured to releasably receive light pipe 240 by a friction fit. In an additional further embodiment, light pipe 240 is secured to light pipe feature 404 by gluing, thermal welding, or other similar joining method. In yet an additional further embodiment, light pipe 240 is secured directly to base housing 122 or lid 120 by gluing, thermal welding, or other similar joining method. As will be appreciated, in other embodiments, light pipe 240 and/or light pipe feature 404 may be similarly included on lid 120. Light pipe 240 and/or light pipe feature 404 are generally included on lid 120, when base housing 122 is to be attached to a surface. Similarly, in yet other embodiments, light pipe 240 and/or light pipe feature 404 may be included on opposing side surfaces 246 of connecting box 100, when lid 120 and base housing 122 will be attached to surfaces in a manner that would otherwise make seeing illumination from light pipe 240 difficult.

Referring to FIGS. 2 and 4, light pipe feature 404 may be of any geometry configured to receive the light source corresponding with light pipe feature 404. The geometry and inside diameter of light pipe feature 404 correspond to the geometry and outside diameter of light pipe 240. Light pipe 240 may be a fiber optic cable, fiber optic fiber, or other similar light transmission structure as would be appreciated by one of ordinary skill in the art. The light source (not shown), providing light to light pipe 240 and thereby through light pipe feature 404, may be a light emitting diode (LED), an incandescent light, a fluorescent light, or any other source of light. In one embodiment, the light source may provide more than one light color. In another embodiment, the light source may provide only one light color. In other embodiments with a transparent, semitransparent, translucent, or semi-translucent material comprising base housing 122, light pipe feature 404 may be omitted and light pipe 240 may illuminate the inside of connecting box 100 or light pipe 240 thereby illuminating connecting box 100.

Referring to FIGS. 1 and 2, when threadedly attached, gland nut 102 extends from a side surface 104 of connecting box 100 and other connector 236 extend from an opposing side surface 246 of connecting box 100. Connecting box 100 may be configured to correspond with connectors beyond other connector 236 shown. In the embodiment illustrated in FIG. 2, for transportation purposes, for avoiding damage to contacts, and for weather resistance, a protective plug 238 may be inserted into other connector 236. Referring to FIG. 2 again, connecting box 100 is configured so that two gland nuts 102 can threadedly attach to two threads 202 of connecting box 100. In another embodiment, connecting box 100 is configured so that four gland nuts 102 can threadedly attach to four threads 202 of connecting box 100. In other embodiments, connecting box 100 may be configured to permit any number of gland nuts 102 to threadedly attach to any number of threads 202 of connecting box 100. In the embodiment illustrated in FIG. 2, connecting box 100 is configured so that two other connectors 236 can attach to connecting box 100 by means of two securing nuts 234 inside of connecting box 100 and a threading on other connectors 236 engaging securing nuts 234. In another embodiment, connecting box 100 is configured so that four other connectors 236 can threadedly attach to connecting box 100. In yet another embodiment, connecting box 100 may be configured to permit any number of other connectors 236 to threadedly attach to connecting box 100. As will be understood by those skilled in the art, in other embodiments, gland nuts 102 and/or other connectors 236 may be attached by other means.

Figure 5:
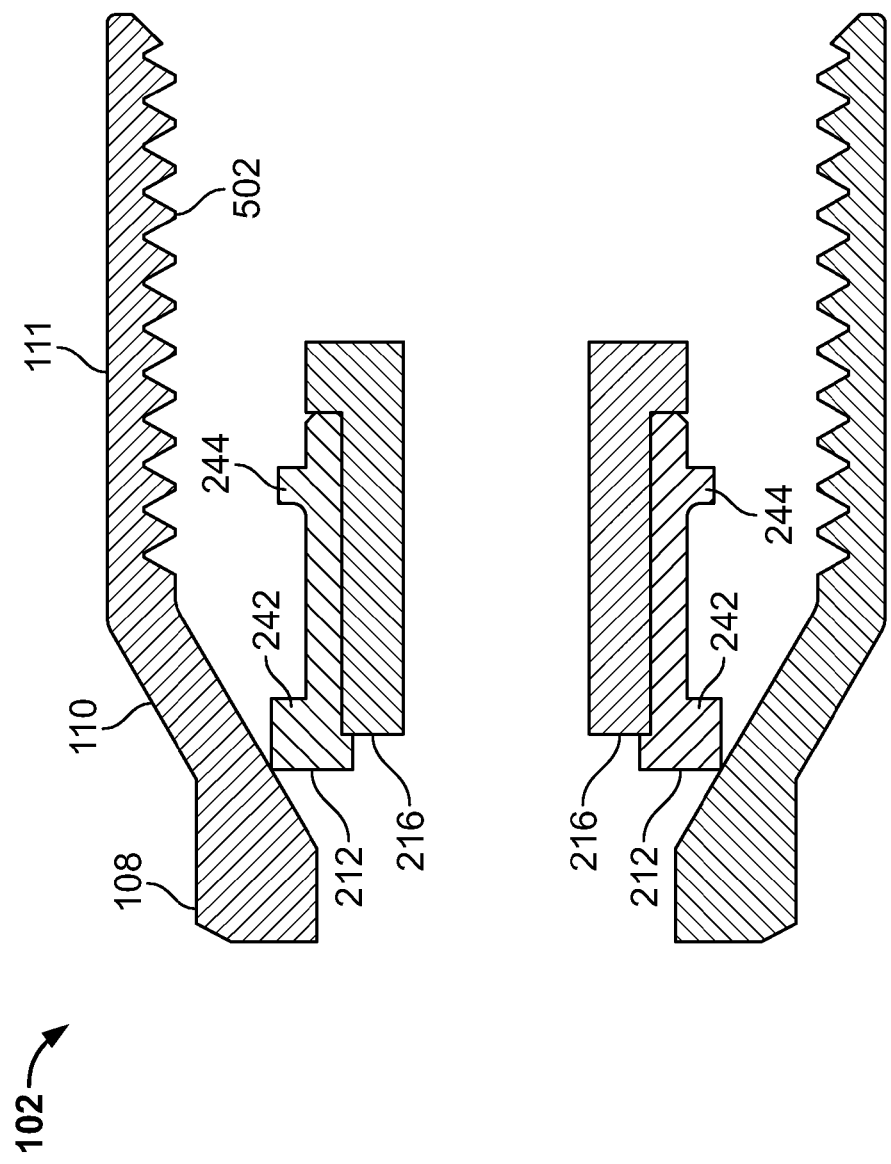
FIG. 5 illustrates a sectioned view of the gland nut according to the invention.

Referring to FIGS. 1 and 5, gland nut 102 includes a nut-shaped portion 108, a tapered portion 110, and a generally cylindrical portion 111 all circumferentially surrounding a cable 106. Referring to the sectioned view of FIG. 5, the interior of gland nut 102 corresponding to generally cylindrical portion 111 includes an inner thread 502 configured to threadedly engage thread 202 of connecting box 100 or to engage threaded portion 222 (FIG. 2) of a corresponding connector. Nut-shaped portion 108 is configured to be rotated by a wrench thereby providing pressure on gland nut 102 in the direction of connecting box 100 by permitting inner thread 502 of gland nut 102 to threadedly engage thread 202 of connecting box 100 or in the direction of the corresponding connector by permitting inner thread 502 of gland nut 102 to threadedly engage threaded portion 222 of the corresponding connector.

Referring to FIG. 2, a gland nut 210, a pinch ring 212, and a cable seal 216 are configured to correspond with a first connector 208 or a second connector 224. Gland nut 210 is substantially the same as gland nut 102. Pinch ring 212 is substantially the same as pinch ring 204. Cable seal 216 is substantially the same as cable seal 206. Gland nut 102, 210 substantially prevents moisture from entering connecting box 100 and/or the connector by providing a tight seal when assembled with pinch ring 204, 212 and cable seal 206, 216. Referring to FIGS. 2 and 5, in the illustrated embodiment, cable seal 206, 216 is a cylindrical body comprised of a thermoplastic elastomer. In other embodiments, cable seal 206, 216 is comprised of other flexible plastics, rubbers, or similar materials. Cable seal 206, 216 is configured to be inserted into pinch ring 204, 212 and circumferentially surround cable 106. In the illustrated embodiment, pinch ring 204, 212 is a cylindrical body comprised of an acetyl resin. In other embodiments, pinch ring 204, 212 is comprised of other hard but flexible plastics. Pinch ring 204, 212 includes a plurality of arms 242 extending from a ring base 244. Arms 242 are configured to engage the interior of tapered portion 110 of gland nut 102. Upon pressure from rotating nut-shaped portion 108 being exerted in the direction of connecting box 100 or the corresponding connector, arms 242 of pinch ring 204, 212 are forced inward toward cable 106. Arms 242 thereby force cable seal 206, 216 to tightly and circumferentially seal cable 106 thereby preventing water or other substances from entering connecting box 100 and/or the corresponding connectors.

Referring to FIG. 1, in the illustrated embodiment, cable 106 extends through nut-shaped portion 108 of gland nut 102 into connecting box 100. As will be understood by those skilled in the art, cable 106 may be any sort of cable configured to conduct electrical charge including, but not limited to, a solar cable, a coaxial cable, underground service equipment cable, or any other mostly round cable.

In embodiment illustrated in FIG. 2, first connector 208 is a pin housing with a cylindrical body configured to threadedly engage gland nut 210 by means of threaded portion 222. Second connector 224 is a socket housing with a cylindrical portion configured to threadedly engage gland nut 210 by means of threaded portion 222. First connector 208 includes a releasing slot 220 configured to prevent the respective corresponding connector (not shown) from being disconnected without a tool. First connector 208 and second connector 224 are both comprised of plastic but could be comprised of any material configured to prevent moisture from entering the connector. As will be understood by those skilled in the art, first connector 208 and/or second connector 224 may be configured to correspond with other conductive interfaces for electrical connectors including, but not limited to, contacts, sockets, plugs, pins, and receptacles.

Referring again to FIG. 2, in one embodiment, contact 214 extends from cable 106. In the illustrated embodiment, contact 214 is comprised of a silver-plated contact. As will be understood by those skilled in the art, the silver-plated contact is used for high conductivity but, in other embodiments, other conductive materials, as are well known by those skilled in the art, may be used.

In the embodiment shown in FIG. 2, cable 106 extends from second gland nut 210, which is oriented proximal to gland nut 102, until cable 106 is split thereby diverging into two contacts. In another embodiment, cable 106 does not split. In yet another embodiment, a plurality of cables 106 are included. In the illustrated embodiment, the nut-shaped portion 108 of second gland nut 210 is located on the end of second gland nut 210 proximal to gland nut 102. Nut-shaped portion 108 of second gland nut 210 is configured to be tightened thereby providing additional pressure on cable 106. As shown, upon first connector 208 threadedly engaging second gland nut 210, first connector 208 and second gland nut 210 enclose second cable seal 216, second pinch ring 212, contact 214, and cable 106. Similarly, upon second connector 224 threadedly engaging second gland nut 210, second connector 224 and second gland nut 210 enclose second cable seal 216, second pinch ring 212, contact 214, and cable 106. In another embodiment, second connector 224 further includes a rubber ring 228 further providing a tighter seal between the first connector 208 and the corresponding electrical connector.

While the invention has been described with reference to a preferred embodiment, it will be understood by those skilled in the art that various changes may be made and equivalents may be substituted for elements thereof without departing from the scope of the invention. For instance, the materials disclosed as comprising the embodiments are exemplary and not exhaustive. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A connecting box for use with a solar panel, comprising:
   a base housing;
   a lid;
   at least one latch; and
   a breather; and
   wherein the base housing is arranged and disposed to retain a substrate, the base housing being configured to releasably attach to the lid,
   wherein the latch is arranged and disposed for a tool to be inserted into a latch release thereby disengaging a latch catch permitting the base housing to be released from the lid, and
   wherein the connecting box is attached to the solar panel by the lid;
   wherein the breather is a membrane arranged and disposed to permit air to travel in or out of the base housing upon a change in temperature or pressure.

2. The connecting box in claim 1, further comprising a connector, the connector comprising a cable configured to extend into or through the base housing onto the substrate.

3. The connecting box in claim 1, further comprising a gland nut comprising:
   a nut-shaped portion configured to be rotated by a tool;
   a generally cylindrical portion including an inner thread;
   a tapered portion;
   a cable seal arranged and disposed to be inserted into a pinch ring;
   the pinch ring arranged and disposed with a plurality of arms extending from a ring base, the plurality of arms of the pinch ring are configured to be forced inward by the tapered portion toward a cable upon the inner thread engaging the connecting box or the connector and forced in the direction of the connecting box or the connector.

4. The connecting box in claim 1, further comprising a plurality of substrate snaps configured to secure the substrate upon positioning it in the base housing.

5. The connecting box in claim 1, further comprising a light source arranged and disposed for transmission of the light source from within the connecting box.

6. The connecting box in claim 5, wherein the light source is arranged and disposed for transmission through a light pipe.

7. The connecting box in claim 1, wherein the base housing is transparent, semitransparent, translucent, or semi-translucent, in whole or in part.

8. The connecting box in claim 1, further comprising a gland nut.

9. The connecting box in claim 1, further comprising a gland nut comprising a nut-shaped portion configured to be rotated by a tool.

10. The connecting box in claim 1, further comprising a gland nut configured to provide an inward force toward a cable upon the gland nut engaging the connecting box.

11. The connecting box in claim 1, wherein the interior of the connecting box is substantially unaffected by environmental stressors.

12. A gland nut comprising:
   a nut-shaped portion configured to be rotated by a tool;
   a tapered portion;
   a generally cylindrical portion including an inner thread, the inner thread configured to threadedly engage a connecting box or a connector;
   a cable seal configured to be inserted into a pinch ring;
   the pinch ring having a plurality of arms extending from a ring base;
   wherein the nut-shaped portion, the tapered portion, the generally cylindrical portion, the cable seal, and the pinch ring are configured to circumferentially bound a cable; and
   wherein the plurality of arms of the pinch ring are configured to be forced inward by the tapered portion toward the cable upon the inner thread engaging the connecting box or the connector and forced in the direction of the connecting box or the connector.

13. The gland nut of claim 12 further comprising the connector.

14. The gland nut of claim 13, further comprising the cable, wherein the cable diverges into a plurality of contacts.

15. The gland nut of claim 14, wherein the plurality of contacts is crimped and silver plated.

16. The gland nut of claim 15, wherein the connector comprises a latch releasing slot configured to disengage the first connector from a corresponding connector upon a tool being inserted into the releasing slot.

17. The gland nut of claim 16, wherein the interior of the gland nut is substantially resistant to environmental stressors.

18. An electrical connector comprising:
   a first gland nut comprising:
      a nut-shaped portion configured to be rotated by a tool;
      a generally cylindrical portion including an inner thread;
      a tapered portion;
      a cable seal arranged and disposed to be inserted into a pinch ring;
      the pinch ring arranged and disposed with a plurality of arms extending from a ring base, the plurality of arms of the pinch ring are configured to be forced inward by the tapered portion toward a cable upon the inner thread engaging the connecting box or the connector and force being exerted in the direction of the connecting box or the connector;
      wherein the nut-shaped portion, the generally cylindrical portion, the cable seal, and the pinch ring are configured to circumferentially bound the cable;
   a second gland nut comprising:
      a second nut-shaped portion configured to be rotated by the tool;
      a second generally cylindrical portion including a second inner thread;
      a second tapered portion;
      a second cable seal arranged and disposed to be inserted into a second pinch ring;
      the second pinch ring arranged and disposed with a second plurality of arms extending from a second ring base, the second plurality of arms of the second pinch ring configured to be forced inward by the second tapered portion toward the cable upon the second inner thread engaging the connecting box or the connector and force being exerted in the direction of the connecting box or the connector;
      wherein the second nut-shaped portion, the second generally cylindrical portion, the second cable seal, and the second pinch ring are configured to circumferentially bound the cable;
   a pin housing arranged and disposed to threadedly engage the first gland nut, the pin housing being arranged and disposed to mate with a socket housing; and
   the socket housing arranged and disposed to threadedly engage the second gland nut, the socket housing being arranged and disposed to mate with the pin housing; and
   wherein the pin housing or the socket housing includes a releasing slot arranged and disposed to require a tool to unmate the pin housing from the socket housing, and
   wherein the electrical connector is arranged and disposed for preventing moisture from entering the electrical connector.

19. The electrical connector of claim 9, wherein the interior of the electrical connector is substantially resistant to environmental stressors.

* * * * *